TELEVISION AUTOMATIC INTRUSION DETECTION SYSTEM

Filed Aug. 15, 1967 2 Sheets-Sheet 1

INVENTOR.
EARL M. KARTCHNER
BY Robert J. Haase
ATTORNEY

INVENTOR.
EARL M. KARTCHNER
BY
Robert J. Haase
ATTORNEY

United States Patent Office
3,531,588
Patented Sept. 29, 1970

3,531,588

TELEVISION AUTOMATIC INTRUSION DETECTION SYSTEM

Earl M. Kartchner, Salt Lake City, Utah, assignor to Sperry Rand Corporation, a corporation of Delaware Filed Aug. 15, 1967, Ser. No. 660,732
Int. Cl. H04n 7/02
U.S. Cl. 178—6 15 Claims

ABSTRACT OF THE DISCLOSURE

Automatic television apparatus for continuously scanning a security-protected scene and for periodically storing a complete frame of live television signals representing the scene. The live television signals and the stored television signals are amplitude compared and pulses representing any differences are coupled by digitalized logic circuits to alarm devices. Upon an alarm, the pulses actuate a gated limiter through which the television signals are applied to a picture tube whereby the signals are clamped to a white level upon each actuation thus outlining any scene intrusion with a white border.

BACKGROUND OF THE INVENTION

Closed circuit television surveillance systems have been used for law enforcement and security purposes for well over a decade. In some instances, the areas under surveillance are normally inactive; in other instances much authorized movement and activity is encountered. Of course, when highly active areas are monitored, continuous security observation is mandatory. In the case of the surveillance of inactive areas, however, it has been the practice to assign other duties to the security personnel who observe the television monitors with the concomitant risk of compromising the effectiveness of the surveillance system. Effective surveillance is compromised because the observer generally is idle and suffers losses of alertness due to the inactive scene which he is viewing.

An ideal closed circuit television system for the security surveillance of inactive areas should automatically initiate an alarm immediately upon the occurrence of any intrusion thereby eliminating the necessity for continuous visual observation. It is also desirable that a readily distinguishable mark be placed on the television image to pinpoint the area of intrusion immediately upon an alarm. Lastly, it is important that the surveillance system respond to slow-moving intrusions and that they be detected with a minimum probability of false alarms. All of the above-mentioned design objectives of an ideal system are realized in accordance with the present invention.

SUMMARY OF THE INVENTION

A television camera is positioned to view an area under security surveillance. One frame of video signals from the camera is stored periodically and the stored frame is compared line-by-line with each successive live frame from the camera. When the difference between the compared signals exceeds a predetermined threshold (indicating some change has taken place relative to the reference scene represented by the stored signals) an alarm is produced and the location of the change is outlined in white on the television image of the scene produced by the live video. The alarm and the white outline are produced only if the difference between the stored video and the live video recurs in accordance with a predetermined time sequence designed to discriminate against false alarms.

DESCRIPTION OF THE PREFERRED EMBODIMENT

Figure 1:
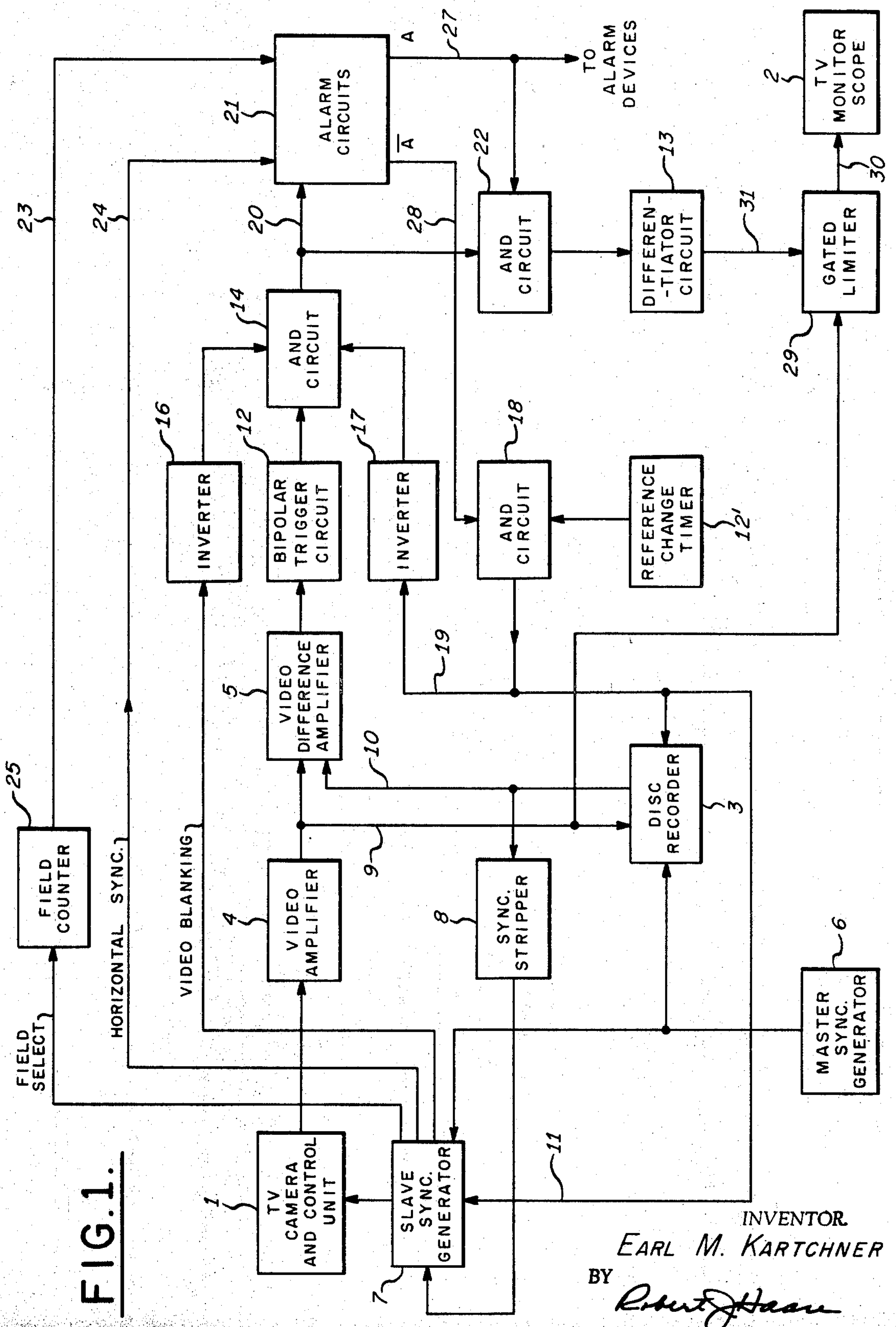
FIG. 1 is a simplified block diagram of a preferred embodiment of the present invention.

The apparatus of the present invention is fully compatible with the use of standard commercial components including television camera and control unit 1, television monitor scope 2 and disc recorder 3. Unit 1 provides conventional television signals comprising vertical and horizontal synchronizing and blanking signals and camera impulses representing the scene under surveillance. Said signal is applied by video amplifier 4 to a first input of difference amplifier 5. The same signals also are applied via line 9 to a first input to disc recorder 3. One complete frame of television signals representing the monitored scene is stored in disc recorder 3 and read therefrom in a manner to be described. The read-out signals are applied via line 10 to a second input of video difference amplifier 5 and to sync stripper 8. The television time base reference signals removed by sync stripper 8 are applied to a fisrt input of slave sync generator 7. Master sync generator 6 also provides television time base reference signals to the disc recorder 3 and to a second input to the slave sync generator 7. Reference change timer 12' and AND circuit 18 determine which input to generator 7 is active. Generator 7 locks to the active reference input and provides drive, sync and blanking signals to television camera 1.

The pulses provided by difference amplifier 5 each time that the corresponding portions of the live and the stored video signals are of different amplitude are applied to bipolar Schmitt trigger circuit 12. Circuit 12 responds to pulses of either positive or negative polarity above a predetermined magnitude. In circuit 12, the video error pulses from circuit 5 are inverted and both the inverted and the non-inverted pulses are separately rectified. Then the two rectified signals are combined to produce a unipolar pulse train. The train is applied to a Schmitt trigger which provides a pulse output each time its input signal exceeds threshold.

The output of circuit 12 is connected to a first input to AND circuit 14. Second and third inputs to AND circuit 14 are derived from inverter circuits 16 and 17. Blanking signals from generator 7 are applied to the input of inverter 16. The output signals from AND circuit 18 on line 19 are applied to the input of inverter circuit 17. The functions of inverter circuits 16 and 17 respectively are to inhibit the conduction of AND circuit 14 whenever video blanking occurs and anytime that a signal is produced on line 19. A new frame of video signals is stored in disc recorder 3 each time that a signal occurs on line 19. Thus, AND gate 14 also is inhibited from conduction whenever a new frame of video signals is being stored.

In the event that a difference in amplitude exists between the live video signal of line 9 and the stored video signal of line 10 exceeding the threshold of circuit 12 at a time when AND circuit 14 is not inhibited, a pulse is produced on line 20 and is jointly applied to alarm circuits 21 and to AND circuit 22. It should be noted that the pulse on line 20 has a duration commensurate with the horizontal dimension of most intruding objects. Alarm circuits 21 also receive field selection and horizontal synchronizing data signals on lines 23 and 24, respectively, which are provided by generator 7. The field counter 25 provides a succession of pulses on line 23. A pulse commences at the beginning of every third field and lasts for one field. The absence of a pulse on line 23 disables alarm circuits 21. The signal on line 24 may be horizontal drive or blanking from generator 7 and triggers alarm circuits 21 at the end of each TV line. In the event that pulses on line 20 recur in accordance with a predetermined sequence which satisfies conditions imposed by logical circuits included within alarm circuits 21, an alarm signal is produced on output line 27. The inverse of the alarm signal (alarm NOT) is produced on output line 28. The alarm NOT signal conditions AND circuit 18 for conduction upon the occurrence of a control pulse from timer 12'. Each control pulse passed by AND circuit 18 triggers recorder 3 to store a new frame of live video from line 9 in lieu of the preceding stored frame. It should be noted that a new frame is not stored after an alarm occurs because AND circuit 18 is blocked in the absence of signal on line 28.

AND circuit 22 is actuated upon the concurrence of the alarm signal on line 27 and the pulses on line 20. The output signal from circuit 22 is differentiated in differentiator circuit 13 to yield a short pulse at the leading edge and at the trailing edge of the pulse on line 20. The short pulses are processed within circuit 13 to have the same polarity suitable for triggering gated limiter 29. Limiter 29 receives the live video signals on line 9 and couples said signals to line 30 without distortion except in the presence of a pulse on line 31 from circuit 22. Each pulse on line 31 clamps the amplitude of the concurring portion of the live video signal then passing through gated limiter 29 to an amplitude representing a white level on monitor scope 2. The white level portions of the live video signal displayed on scope 2 encircle the location or locations within the scene under surveillance where intrusion exists. Intrusion is defined as any change in the scene under surveillance relative to the stored scene which satisfies the anti-false alarm logic of alarm circuits 21, to be described in connection with FIG. 2. Objects added to the scene as well as objects removed from the scene are intrusions which produce a white outline on monitor scope 2 and an alarm signal on line 27. The alarm signal on line 27 also may be applied to various alarm devices to aid in attracting attention to the fact that an intrusion has occurred.

Figure 2:
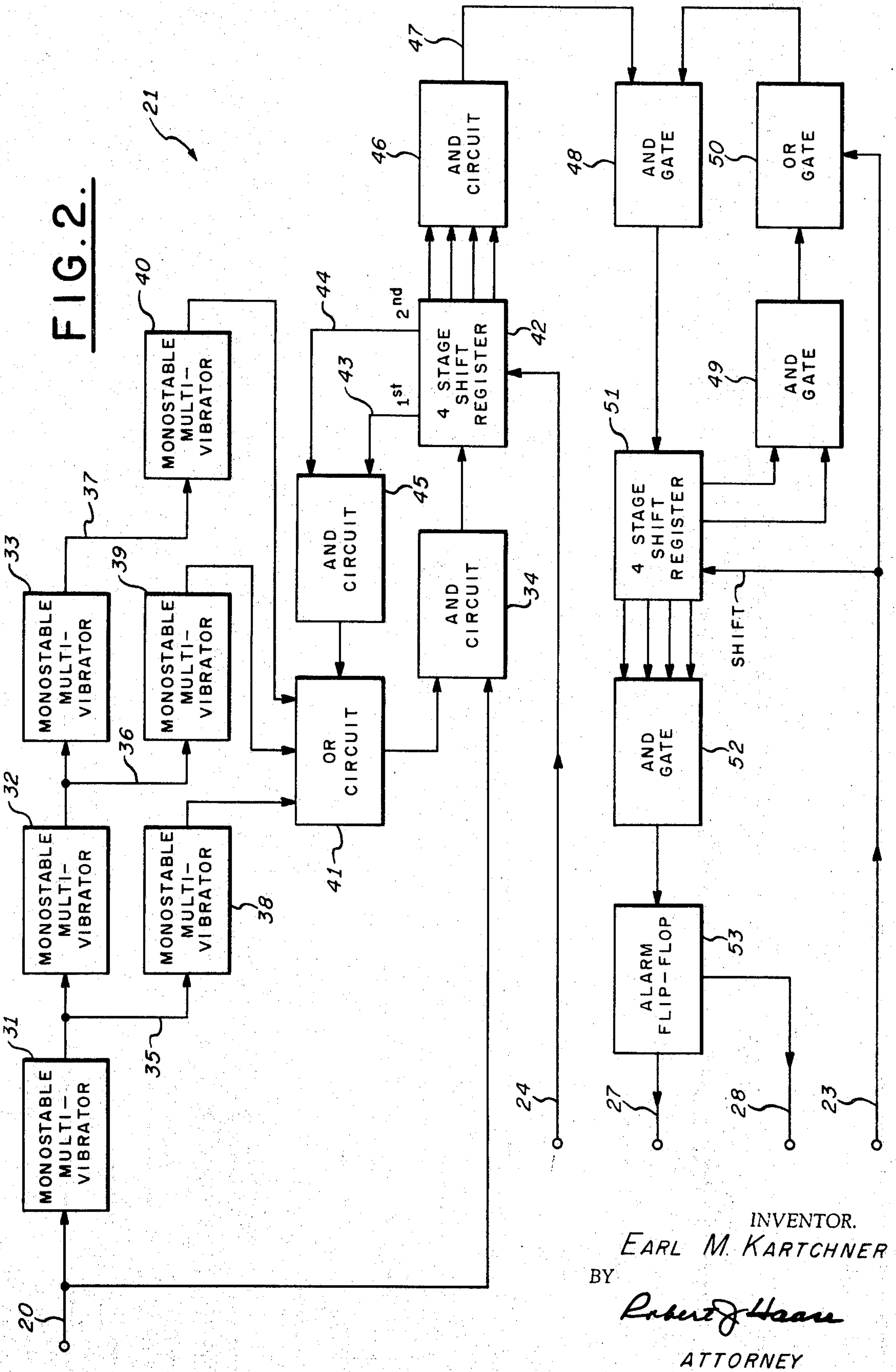
FIG. 2 is a simplified block diagram of the alarm circuits represented in FIG. 1.

The block diagram of FIG. 2 represents alarm circuits 21 of FIG. 1. Input lines 20, 23 and 24 and output lines 27 and 28 of alarm circuits 21 are similarly numbered in FIGS. 1 and 2. A pulse on line 20 is applied to cascaded monostable multivibrators 31, 32 and 33 and to a first input to AND circuit 34. Each of the multivibrators produces an output pulse after a predetermined delay following the respective input pulse in a conventional manner. The amount of the predetermined delay is made equal to the time required for scanning one horizontal line on TV monitor scope 2. In a typical instance, said time is 63.5 microseconds. Thus, a pulse on line 20 triggers three successive pulses on lines 35, 36 and 37 separated from each other by 63.5 microseconds. The three pulses are applied to monostable multivibrators 38, 39 and 40, respectively, which produce short duration gating pulses (for example, 2 microseconds in width) in response to the respective input triggers of lines 35, 36 and 37. The three gating pulses are applied via OR circuit 41 to a second input to AND circuit 34. The output of AND circuit 34 is connected to the input of four-stage shift register 42, the first two stages of which are connected by lines 43 and 44 to AND circuit 45. The output of circuit 45 is connected to a fourth input to OR circuit 41. Each of the four stages of shift register 42 is connected to AND circuit 46 which provides an output pulse on line 47 upon the satisfaction of the condition that each of the four stages of register 42 is in binary state ONE.

Alarm circuits 21 are designed to resist spurious pulses that might appear on line 20 of FIG. 1 in the absence of a bonafide intrusion. To this end, alarm circuits 21 provide three time "windows" following the occurrence of a pulse on line 20. Each "window" is two microseconds in duration and is separated from the next by the time required for one horizontal scan time of television monitor scope 2. Thus, by definition an intrusion becomes that which causes pulses on line 20 to occur on four successive horizontal scan lines within two microseconds of the same position relative to the start of the scan lines.

Shift register 42 receives a shift pulse on line 24 upon the initiation of each horizontal scan line. Consequently, all of the stages of shift register 42 are in binary state ZERO in the absence of an intrusion. Signals are provided on lines 43 and 44 actuating AND circuit 45 in the event that the first stages of register 42 are both in state ZERO. The output signal produced upon the actuation of circuit 45 is applied via OR circuit 41 to condition AND circuit 34 for conduction upon the occurrence of the next following pulse on line 20. It should be noted that AND circuit 34 will pass the first pulse occurring on line 20 irrespective of its position relative to the start of the respective horizontal scan line. The output pulse from AND circuit 34 is applied to the first stage of register 42 (thereby blocking circuit 34) and is shifted into the second stage upon the occurrence of the next following shift pulse on line 24. The same pulse which was applied to the first stage register 42 also triggers monostable multivibrators 31, 32, 33, 38, 39 and 40 to produce three successive time "windows" each of which conditions AND gate 34 for conduction for a two microsecond interval. The first "window" occurs exactly on horizontal scan time subsequent to the initiating pulse on line 20. The second and third "windows" are each exactly one horizontal scan time later than the respectively preceding "windows." Intrusion persists at least for four consecutive horizontal scan times whereby a second pulse will occur on line 20 simultaneously with the first of the three time "windows" at AND circuit 34 to provide a second input pulse to shift register 42. The binary ONES in the first two stages of register 42 are shifted into stages 2 and 3 upon the occurrence of the next pulse on line 24. Similarly, the next two pulses on line 20 coincide with the two remaining time "windows" at AND circuit 34 to produce two additional input pulses to register 42 whereby each of the register stages assumes the condition of binary ONE. AND circuit 46 becomes actuated to provide an output signal on line 47 indicating that intrusion has occurred at the same relative position on four consecutive horizontal scan lines of TV monitor scope 2. It will be recalled that AND circuit 45 no longer conditions AND circuit 34 for conduction after the first of the four successive pulses occurs on line 20. AND circuit 34 is conditioned for conduction following the first of said four pulses by the three successive time "windows" from OR circuit 41. On this manner the three time "windows" automatically are placed in the same relative position as the first occurring of the pulses on line 20, whether bonafide or false intrusion has occurred. Bonafide intrusions satisfy the requirements established by the three time "windows" whereas false intrusions (spurious pulses) are rejected in part.

As a further step in distinguishing between bonafide and false intrusions, the above-described time "window" test is repeated for four selected fields of television signals. This is accomplished with the aid of circuits 48, 49, 50, 51 and 52 which operate in a manner fully equivalent to that of circuits 34, 45, 41, 42 and 46 previously described. Briefly, the presence of binary ZEROES in the first two stages of register 51 actuates AND circuit 49 to produce an output signal which is coupled via OR circuit 50 to a first input of AND circuit 48. The first pulse on line 47 passes through AND circuit 48 and into the first stage of register 51 wherein it is shifted upon the occurrence of the next following field select pulse on line 23 from field counter 25 of FIG. 1. AND circuit 48 is conditioned for conduction upon the occurrence of the next following field select pulse on line 23 which is coupled via OR circuit 50 to AND circuit 48. The second pulse occurring on line 47 then passes through AND circuit 48 into shift register 51 and so on. In the event that pulses occur on line 47 on the four selected fields of the television signals, each of the stages of register 51 assumes the condition of binary ONE to actuate AND circuit 52. Circuit 52 provides an output signal triggering alarm flip-flop 53 to provide an alarm signal on line 27 and an alarm NOT signal on line 28. A bonafide intrusion will satisfy the requirements imposed by AND circuits 46 and 52; random pulses on line 20 rarely will satisfy said conditions whereby false intrusions are essentially eliminated.

From the foregoing, it will be appreciated the apparatus of the type described may readily be adapted to such uses as environment change detection, document or object comparison, radar or sonar monitoring, signal change detection, and the like.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus comprising
means of scanning an area and for producing first signals representing said area,
storage means coupled to receive said first signals and responsive to a second signal to store said first signals representing the area scanned upon the occurrence of said second signal,
means coupled to receive said first signals and the stored signals for producing a third signal whenever said first signals and said stored signals differ from each other by an amount exceeding a threshold,
alarm signalling means,
a source of said second signal, and
inhibitable coupling means responsive to said second signal for applying said third signal to said alarm signalling means only in the absence of said second signal and for inhibiting the application of said third signal to said alarm signalling means upon the occurrence of said second signal,
said second signal being applied to said storage means.

2. Apparatus as defined in claim 1 wherein said alarm signalling means generates an alarm signal and an alarm NOT signal and further including
AND circuit means for coupling said second signal to said inhibitable coupling means and to said storage means,
said second signal and said alarm NOT signal being applied to said AND circuit means.

3. Apparatus as defined in claim 1 wherein said alarm signalling means generates an alarm signal and further including
means for differentiating said third signal,
AND circuit means for coupling said third signal to said differentiating means,
said alarm signal and said third signal being applied to said AND circuit means,
a gated limiter coupled to receive said first signal and the differentiated third signal, and
a monitor scope coupled to the output of said gated limiter.

4. Apparatus as defined in claim 3 wherein said gated limiter in response to each said differentiated third signal limits said first signals to an amplitude representing a white level on said monitor scope.

5. Apparatus as defined in claim 1 wherein said alarm signalling means generates an alarm signal and an alarm NOT signal and further including
first AND circuit means for coupling said second signal to said inhibitable coupling means and to said storage means,
said second signal and said alarm NOT signal being applied to said AND circuit means,
means for differentiating said third signal,
second AND circuit means for coupling said third signal to said differentiating means,
said alarm signal and said third signal being applied to said second AND circuit means,
a gated limiter coupled to said first signals and the differentiated third signal, and
a monitor scope coupled to the output of said gated limiter.

6. Apparatus as defined in claim 5 wherein said gated limiter in response to each said differentiated third signal limits said first signals to an amplitude representing a white level on said monitor scope.

7. Apparatus comprising
television camera means for scanning an area in accordance with a raster and for providing first signals representing said area, said television camera means including means for providing a second signal representing the video blanking portions of said raster,
storage means for storing said first signals representing the area scanned,
comparator means responsive to said first signals and the stored signals for providing a third signal whenever said first signals and said stored signals differ from each other by an amount exceeding a threshold,
alarm signalling means, and
inhibitable coupling means responsive to said second signal for applying said third signal to said alarm signalling means only in the absence of said second signal and for inhibiting the application of said third signal to said alarm signalling means upon the occurrence of said second signal.

8. Apparatus as defined in claim 7 wherein said alarm signalling means generates an alarm signal and further including
means for differentiating said third signal,
AND circuit means for coupling said third signal to said differentiating means,
said alarm signal and said third signal being applied to said AND circuit means,
a gated limiter coupled to receive said first signal and the differentiated third signal, and
a monitor scope coupled to the output of said gated limiter.

9. Apparatus as defined in claim 8 wherein said gated limiter in response to each said differentiated third signal limits said first signals to an amplitude representing a white level on said monitor scope.

10. Apparatus comprising
means for scanning an area and for producing first signals representing said area,
storage means for storing said first signals representing the area scanned,
comparator means responsive to said first signals and the stored signals for providing a third signal whenever said first signals and said stored signals differ from each other by an amount exceeding a threshold, and
alarm signalling means responsive to said third signal including
time window means responsive to said third signal for establishing periodically occurring time windows in accordance with an occurrence of said third signal and
means coupled to said time window means for providing an alarm signal only when said third signal occurs during each of said time windows.

11. Apparatus comprising
television camera means for scanning an area in accordance with a raster and for providing first signals representing said area,
storage means for storing said first signals representing the area scanned,
comparator means responsive to said first signals and the stored signals for providing a third signal whenever said first signals and said stored signals differ from each other by an amount exceeding a threshold, and alarm signalling means responsive to said third signal including time window means responsive to said third signal for establishing time windows corresponding to substantially the same portion of predetermined lines of said raster, respectively, in accordance with an occurrence of said third signal and means coupled to said time window means for providing an alarm signal only when said third signal occurs during each of said time windows.

12. Apparatus comprising means for scanning an area and for providing first signals representing said area, storage means for storing said first signals representing the area scanned, comparator means responsive to said first signals and the stored signals for providing a third signal whenever said first signals and said stored signals differ from each other by an amount exceeding a threshold, alarm signalling means coupled to receive said third signal for generating an alarm signal in response thereto, monitor scope means, and outlining means coupled to receive said first and third signals and said alarm signal for outlining a change in said scanned area on said monitor scope upon the occurrence of said alarm signal.

13. Apparatus as defined in claim 12 in which said outlining means comprises, means for differentiating said third signal, AND circuit means for coupling said third signal to said differentiating means, said alarm signal and said third signal being applied to said AND circuit means, and a gated limiter coupled to receive said first signals and the differentiated third signal, said monitor scope means being coupled to the output of said gated limiter.

14. Apparatus as defined in claim 13 wherein said gated limiter in response to each said differentiated third signal limits said first signals to an amplitude representing a white level on said monitor scope.

15. Apparatus as defined in claim 14 wherein said scanning means comprises television camera means.

References Cited

UNITED STATES PATENTS 2,493,542 1/1950 Merchant.

RICHARD MURRAY, Primary Examiner

B. LEIBOWITZ, Assistant Examiner